United States Patent
Li et al.

(10) Patent No.: US 8,571,407 B2
(45) Date of Patent: Oct. 29, 2013

(54) OPTICAL COHERENT RECEIVER, APPARATUS FOR AND METHOD OF MONITORING PERFORMANCE THEREOF

(75) Inventors: Lei Li, Beijing (CN); Zhenning Tao, Beijing (CN); Hisao Nakashima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 759 days.

(21) Appl. No.: 12/567,245

(22) Filed: Sep. 25, 2009

(65) Prior Publication Data
US 2010/0092168 A1  Apr. 15, 2010

(30) Foreign Application Priority Data

Sep. 27, 2008  (CN) .......................... 2008 1 0149796

(51) Int. Cl.
*H04B 10/08*  (2006.01)
*H04B 17/00*  (2006.01)

(52) U.S. Cl.
USPC ............................................................ 398/25

(58) Field of Classification Search
USPC .................................................. 398/25
See application file for complete search history.

(56) References Cited

U.S. PATENT DOCUMENTS

2005/0271137 A1* 12/2005 Kolze et al. .................. 375/233

OTHER PUBLICATIONS

Chinese Office Action mailed Jan. 31, 2012 in corresponding Chinese Application No. 200810149796.1.

* cited by examiner

*Primary Examiner* — Shi K Li
(74) *Attorney, Agent, or Firm* — Staas & Halsey LLP (57) ABSTRACT

The present invention relates to an optical coherent receiver and an apparatus for and a method of monitoring performance thereof. The apparatus for monitoring performance of the optical coherent receiver makes use of a first signal and a second signal from the optical coherent receiver to monitor performance of the optical coherent receiver, and comprises a first subtracter, for subtracting the second signal from the first signal to obtain a first subtraction result; a squarer, for obtaining a square of the first subtraction result; a delayer, for delaying the first subtraction result; a multiplier, for multiplying the first subtraction result with the delayed first subtraction result; and a second subtracter, for subtracting the result of the multiplier from the result of the squarer.

13 Claims, 11 Drawing Sheets

OPTICAL COHERENT RECEIVER, APPARATUS FOR AND METHOD OF MONITORING PERFORMANCE THEREOF

FIELD

The present invention relates to optical communications, and more particularly to an optical coherent receiver.

BACKGROUND

With the gradual enhancement of the requirements for capacity and flexibility of the optical communications system, coherent optical communications technology becomes more and more important. In comparison with incoherent technologies (such as on-off key, OOK) or self-coherent technologies (such as differential quadrature phase shift keying DQPSK), the coherent technology has the following advantages: a gain of 3 dB optical signal-to-noise ratio (OSNR), the possibility to employ more efficient modulation technologies (such as quadrature modulation, QAM) to enhance transmission capacity, the convenient use of electric equalization technology to respond to changes in channels, and to reduce production costs, etc.

The structure of an optical coherent receiver is also complicated relative to the traditional incoherent or self-coherent receiver. For example, besides the traditional optoelectric detection module, the optical coherent receiver must also include a phase recovering module and an adaptive electric equalization module, etc. The complicated structure and the adaptive characteristics of the receiver demand that the physical layer working performance of the receiver be monitored so as to quickly position and remove failures. However, performance monitoring of an optical receiver is traditionally carried out by statistics about the error rate (namely, bit error rate) of the finally recovered digital bits, and such statistics is performed after the transmission frame structure has been recovered. Accordingly, the bit error rate obtained by such statistics is further subjected to influences of non-physical layer factors (such as the multiplexing mode of the receiver and the frame structure of the transmission data, etc.), so that the bit error rate cannot directly and exactly reflect the physical layer working performance of the receiver. Moreover, statistics about the bit error rate usually takes a considerable lot of time, fifteen minutes or an hour for instance, and such lengthy period of time is obviously to the detriment of failure positioning and removal. There is hence an urgent need for an apparatus and a method to quickly, precisely and directly monitor the physical layer working performance of the optical coherent receiver.

SUMMARY OF THE INVENTION

The present invention is proposed in view of the above problems of the prior art to overcome one or more deficiencies existent in the prior art. The present invention proposes an apparatus for and a method of monitoring the working performance of an optical coherent receiver to directly monitor the physical layer working performance of the optical coherent receiver.

To achieve the above objectives, the present application provides the following aspects.

Aspect 1: An apparatus for monitoring performance of an optical coherent receiver, the apparatus making use of a first signal and a second signal from the optical coherent receiver to monitor performance of the optical coherent receiver, and the apparatus including: a first subtracter, for subtracting the second signal from the first signal to obtain a first subtraction result; a squarer, for obtaining a square of the first subtraction result; a delayer, for delaying the first subtraction result; a multiplier, for multiplying the first subtraction result with the first subtraction result delayed by the delayer; and a second subtracter, for subtracting the result of the multiplier from the result of the squarer.

Aspect 2: The apparatus for monitoring performance of an optical coherent receiver according to Aspect 1, wherein the optical coherent receiver includes a data recovering device, the first signal is a signal input into the data recovering device, and the second signal is a signal output from the data recovering device.

Aspect 3: The apparatus for monitoring performance of an optical coherent receiver according to Aspect 1, further including an averager, for averaging the result output by the second subtracter.

Aspect 4: The apparatus for monitoring performance of an optical coherent receiver according to any one of Aspects 1 to 3, further including a first averager, for averaging the square of the first subtraction result obtained by the squarer; and a second averager, for averaging the multiplication result of the multiplier; wherein the second subtracter subtracts the result of the second averager from the result of the first averager.

Aspect 5: An optical coherent receiver including a data recovering device, wherein the optical coherent receiver further comprises the apparatus according to any one of Aspects 1 to 4, the first signal is a signal input into the data recovering device, and that the second signal is a signal output from the data recovering device.

Aspect 6: The optical coherent receiver according to Aspect 5, further including a down-sampling device, for down-sampling the first signal and the second signal, wherein the apparatus for monitoring performance of an optical coherent receiver monitors the performance of the optical coherent receiver in accordance with the down-sampled first signal and the down-sampled second signal.

Aspect 7: The optical coherent receiver according to Aspect 5, further including a reporting unit, for converting the output of the second subtracter or the averaged output of the second subtracter into commonly employed performance parameters and/or channel noise parameters of the receiver.

Aspect 8: The optical coherent receiver according to Aspect 5, wherein the optical coherent receiver is a dual-polarization optical coherent receiver, and the optical coherent receiver includes two apparatuses for monitoring the performance of optical coherent receiver, for monitoring performance of a first polarization state receiving branch and performance of a second polarization state receiving branch, respectively.

Aspect 9: The optical coherent receiver according to Aspect 8, wherein the first polarization state receiving branch includes a first equalization filter, the second polarization state receiving branch includes a second equalization filter, and the optical coherent receiver further comprises a first filter coefficient control device, for controlling the first equalization filter in accordance with an output of the apparatus for monitoring the performance of optical coherent receiver that monitors the first polarization state receiving branch; and a second filter coefficient control device, for controlling the second equalization filter in accordance with an output of the apparatus for monitoring the performance of optical coherent receiver that monitors the second polarization state receiving branch.

Aspect 10: The optical coherent receiver according to Aspect 8, wherein the first polarization state receiving branch includes a first adaptive filter, the second polarization state receiving branch includes a second adaptive filter, and the optical coherent receiver further comprises an adaptive filter coefficient control device, for controlling the first adaptive filter and the second adaptive filter in accordance with both the output of the apparatus for monitoring the performance of optical coherent receiver that monitors the first polarization state receiving branch and the output of the apparatus for monitoring the performance of optical coherent receiver that monitors the second polarization state receiving branch.

Aspect 11: The optical coherent receiver according to Aspect 10, wherein the adaptive filter coefficient control device comprises a command receiving unit, for receiving performance information from the optical coherent receiver; a physical layer performance determining unit, for determining performance of the physical layer of the optical coherent receiver; and a filter coefficient adjusting unit, for performing coefficient updating control on the first adaptive filter and the second adaptive filter when it is determined by the physical layer performance determining unit that the performance of the physical layer is good.

Aspect 12: A method of monitoring performance of an optical coherent receiver, the method making use of a first signal and a second signal from the optical coherent receiver to monitor performance of the optical coherent receiver, and including a first subtracting step, for subtracting the second signal from the first signal to obtain a first subtraction result; a squaring step, for obtaining a square of the first subtraction result; a delaying step, for delaying the first subtraction result; a multiplying step, for multiplying the first subtraction result by the delayed first subtraction result; and a second subtracting step, for subtracting the result of the multiplying step from the result of the squaring step.

Aspect 13: The method according to Aspect 12, wherein further including an averaging step, for averaging the result output from the second subtracting step.

Aspect 14: The method according to any one of Aspects 12 to 13, further including a first averaging step, for averaging the square of the first subtraction result obtained in the squaring step; and a second averaging step, for averaging the multiplication result of the multiplying step; wherein the second subtracting step subtracts the result of the second averaging step from the result of the first averaging step.

Aspect 15: A computer program, when executed by a logic device, enabling the logic device to serve as the apparatus for monitoring performance as recited in the above invention or enabling the logic device to carry out the method as recited in the above aspects.

Aspect 16: A computer readable storage medium, storing the computer program according to Aspect 15.

The apparatus and method according to the present invention can quickly and precisely reflect the change in performance of the receiver. Monitoring results provided by the claimed apparatus and method can be applied to positioning of receiver failures, adjustment of receiver control parameters and estimation of channel characteristics, etc.

BRIEF DESCRIPTION OF THE DRAWINGS

Embodiments of the present invention are described in detail below with reference to the drawings, whereby the aforementioned and other objectives, characteristics and advantages of the present invention become more apparent. Moreover, component parts in the drawings are not drawn in proportions, as they are illustrated merely to exemplify the principles of the present invention. Elements and features illustrated/described in one Figure or in one embodiment can be combined with elements and features illustrated/described in one or more other Figures or embodiments. Furthermore, the same reference numeral in the Figures indicates corresponding component parts in several Figures, and can be used to indicate corresponding component parts employed in more than one embodiment. Additionally, for the sake of brevity and cartographic convenience, other component parts that are well known to those skilled in the art to be also present in the present invention are not shown in the drawings. In the drawings.

DETAILED DESCRIPTION OF THE INVENTION

The apparatus for and method of monitoring performance of an optical coherent receiver according to the present invention are described in greater detail below with reference to the accompanying drawings.

Figure 1:
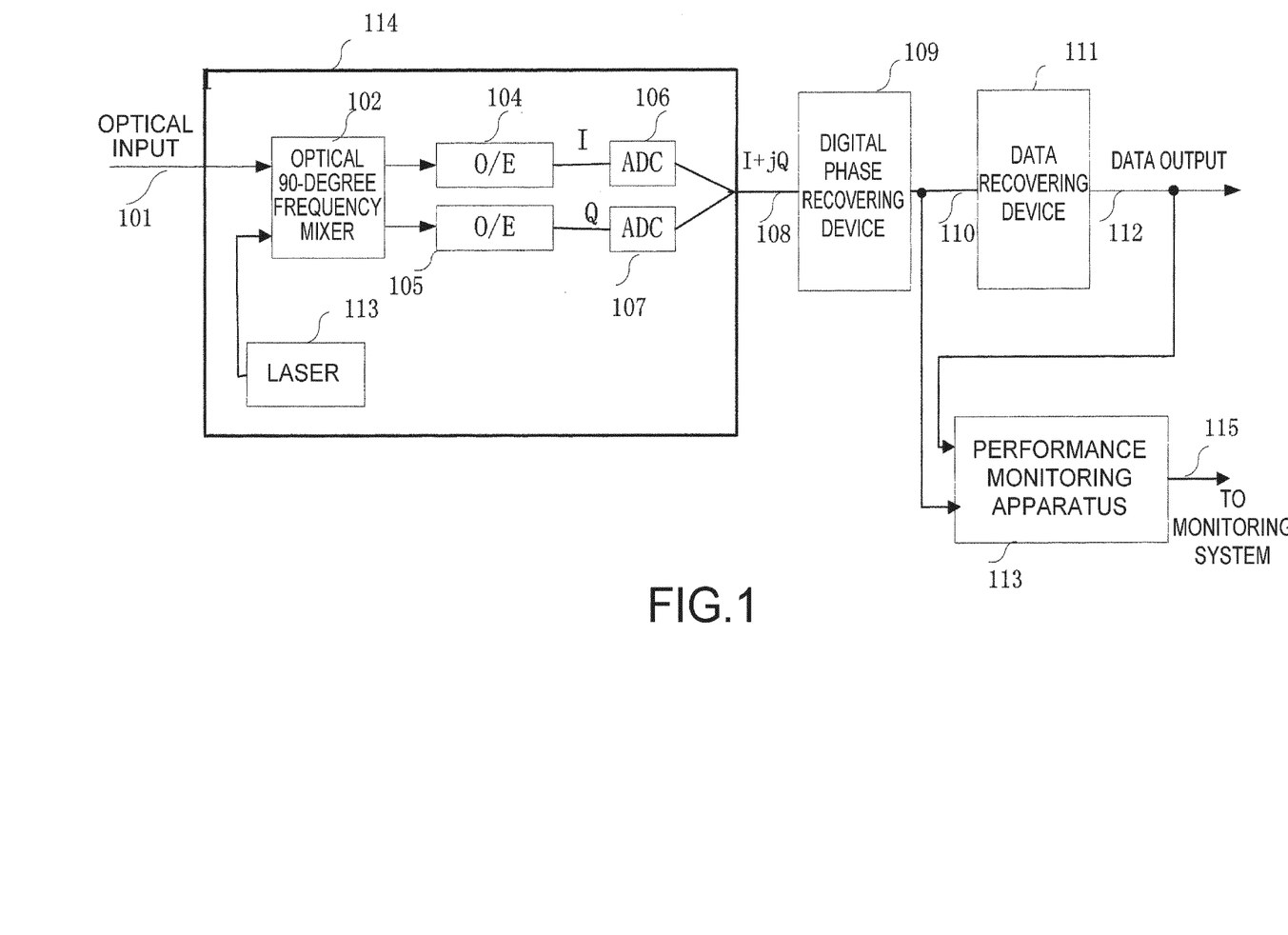
FIG. 1 illustrates an optical coherent receiver employing the apparatus for monitoring performance according to the present invention.

FIG. 1 illustrates an optical coherent receiver having the apparatus for monitoring performance according to the present invention. The optical 90-degree frequency mixer 102, the optoelectric (O/E) converters 104 and 105, the analog-to-digital converters (ADC) 106 and 107, and the laser 103 in FIG. 1 constitute the front end 114 of an optical coherent receiver. Function of this section is to convert the received optical signal 101 into a baseband electric signal 108. The baseband electric signal 108 can be expressed as I+jQ. In general circumstances, the argument of the baseband electric signal 108 includes not only the data information $\phi_d$, but also the phase offset $\phi_0$ between carrier and local oscillation as well as the influence $\phi_n$ of the noise on the phase. Function of the digital phase recovering device 109 is to remove the phase offset $\phi_0$ in the baseband electric signal 108. The output 110 from the digital phase recovering device 109 can be expressed as $\phi_d+\phi_n+\Delta\phi_0$, wherein $\Delta\phi_0$ is the error in phase recovery. The data recovering device 111 determines the data information $\phi_d$ in accordance with the output 110 from the digital phase recovering device 109. These modules constitute the optical coherent receiver as publicly known. By contrast, the performance monitoring apparatus 115 according to the present invention performs quick and precise estimation on the performance of the receiver in accordance with both the output 110 from the digital phase recovering device 109 and the output 112 from the data recovering device 111. Principle of the apparatus for and method of monitoring performance according to the present invention is to subtract the data information $\phi_d$ from the output 110 of the digital phase recovering device 109 so as to obtain the error in phase recovery and the phase of the noise, namely $\phi_n+\Delta\phi_0$, which is referred to in the present invention as the residual phase noise. The residual phase noise of the $k^{th}$ data symbol can be expressed as $\phi_{n,k}+\Delta\phi_{0,k}$, while the residual phase noise of the $k+1^{th}$ data symbol can be expressed as $\phi_{n,k+1}+\Delta\phi_{0,k+1}$. According to the characteristics of noises, $\phi_{n,k}$ and $\phi_{n,k+1}$ are irrelevant to each other in statistics, and according to the characteristics of phase offset, it can be considered that $\Delta\phi_{0,k} \approx \Delta\phi_{0,k+1}$. Accordingly, the variance of the noise phase can be obtained through calculation of the self-correlation of the residual phase noises, namely $E\{\phi_{n,k}^2\}=R_{\phi_{n,k}+\Delta\phi_{n,k}}(0)-R_{\phi_{n,k}+\Delta\phi_{n,k}}(1)$, wherein $R_{\phi_{n,k}+\Delta\phi_{n,k}}(0)$ and $R_{\phi_{n,k}+\Delta\phi_{n,k}}(1)$ are respectively self-correlations of the residual phase noise shifted as 0 and shifted as 1, namely, $R_{\phi_{n,k}+\Delta\phi_{n,k}}(0)=E\{(\phi_{n,k}+\Delta\phi_{n,k})^2\}$, $R_{\phi_{n,k}+\Delta\phi_{n,k}}(1)=E\{(\phi_{n,k}+\Delta\phi_{n,k})(\phi_{n,k+1}+\Delta\phi_{n,k+1})\}$. The obtained variance $E\{\phi_{n,k}^2\}$ of the noise phase has a signal-to-noise ratio of $\rho_s$ corresponding to the baseband electric signal, namely $\rho_s=\frac{1}{2}E\{\phi_{n,k}^2\}$.

In the receiving system with the noise as the main performance influencing factor, the signal-to-noise ratio of $\rho_s$ directly represents the performance of the receiver, taking a coherent QPSK receiver for example, it is possible to directly obtain the bit error rate $BER=Q(\sqrt{\rho_s})$ of the receiver from $\rho_s$. On the other hand, at the same time, as seen from the perspective of channel monitoring, the signal-to-noise ratio of $\rho_s$ corresponds to the noise characteristics of the channel on a one-to-one basis. In optical communications, the noise characteristics of the channel are usually expressed by a ratio between an optical signal power and an optical noise power over 0.1 nm, and this is shortened as optical signal-to-noise ratio, namely OSNR@0.1 nm. The OSNR@0.1 nm can be directly obtained from the signal-to-noise ratio of $\rho_s$ under the presumption of an ideal receiver, and the expression thereof is $$OSNR@0.1 \text{ nm} = \frac{B}{25 \times 10^9}\rho_s,$$

wherein B is the bit rate of the transmission signal. As such, the method of monitoring performance according to the present invention further monitors the noise characteristics of the channel while at the same time monitoring the performance of the receiver.

Figure 2A:
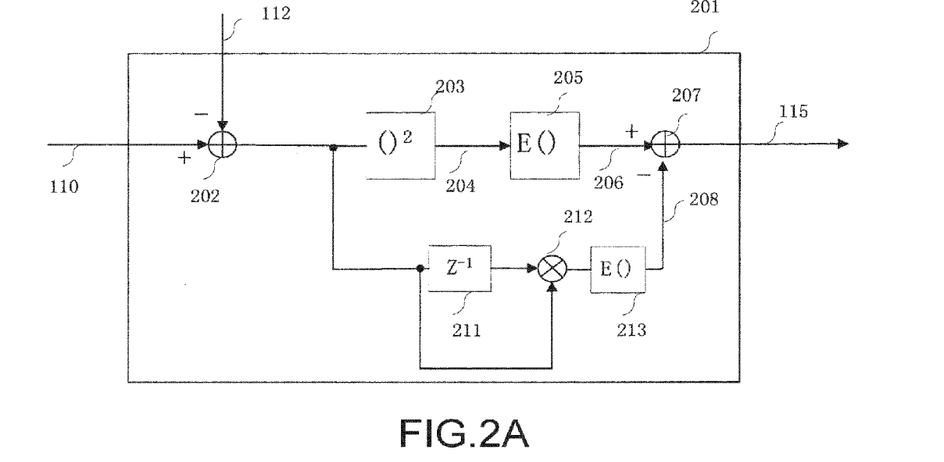
FIGS. 2A and 2B are structural block diagrams exemplarily illustrating the apparatus for monitoring performance according to the present invention respectively.
Figure 2B:
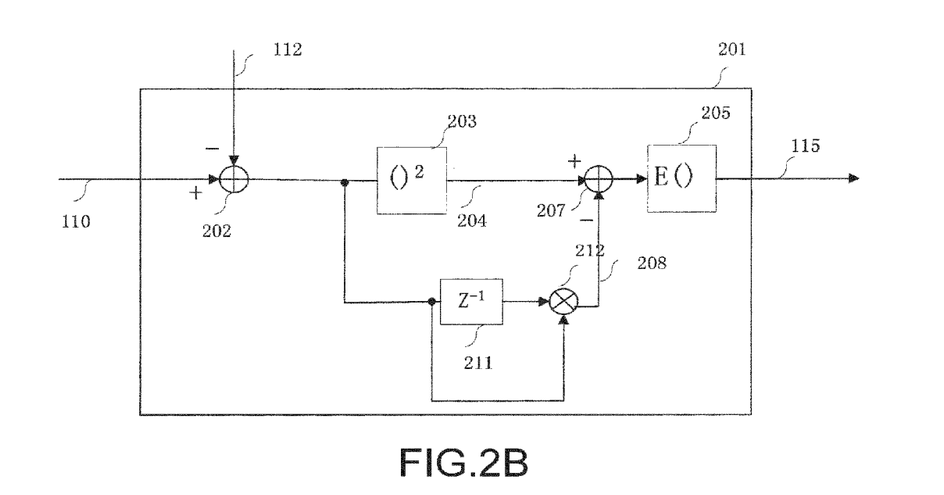

FIG. 2 provides two embodiments of the apparatus for monitoring performance according to the present invention. In the embodiment as shown in FIG. 2A, the input 110 is the output from the phase recovering device 109, namely $\phi_d+\phi_n+\Delta\phi_0$, while the input 112 is the output from the data recovering device 111, namely $\phi_d$. The input 112 is subtracted from the input 110 by the subtracter 202 (the first subtracter) to obtain the residual phase noise $\phi_n+\Delta\phi_0$ (the first subtraction result). The residual phase noise is divided into two branches, one branch is used by the squarer 203 to obtain the square of the residual phase noise, and the averager 205 then averages the square of the residual phase noise obtained by the squarer 203 to obtain $R_{\phi_{n,k}+\Delta\phi_{n,k}}(0)$, while the other branch is delayed by the delayer 211 (for one symbol period for instance). The delayer 211 can for instance be realized by a register. The multiplier 212 multiplies the residual phase noise with the delayed residual phase noise due to registering for instance. The multiplication result is averaged by the averager 213 to obtain $R_{\phi_{n,k}+\Delta\phi_{n,k}}(1)$. $R_{\phi_{n,k}+\Delta\phi_{n,k}}(1)$ is subtracted from $R_{\phi_{n,k}+\Delta\phi_{n,k}}(0)$ by the subtracter 207 (the second subtracter), and the output 115 from the subtracter 207 is the variance $E\{\phi_{n,k}^2\}$ of the noise phase (the second subtraction result). As previously mentioned, $E\{\phi_{n,k}^2\}$ directly represents the performance of the receiver.

The apparatus for monitoring performance of an optical coherent receiver as shown in FIG. 2B is a simplified realization of the apparatus for monitoring performance of an optical coherent receiver as shown in FIG. 2A. In comparison with FIG. 2A, the averager 213 and the averager 205 are removed from FIG. 2B, but an averager 213' is added after the subtracter 207. Thus averaging is performed subsequent to subtracting, so as to spare one averager.

Moreover, an averager (such as the averager 205) can be added after the squarer 203 as shown in FIG. 2B, and an averager (such as the averager 213) can be added after the multiplier 212. This is actually equivalent to adding an averager after the subtracter 207 as shown in FIG. 2A.

Figure 3:
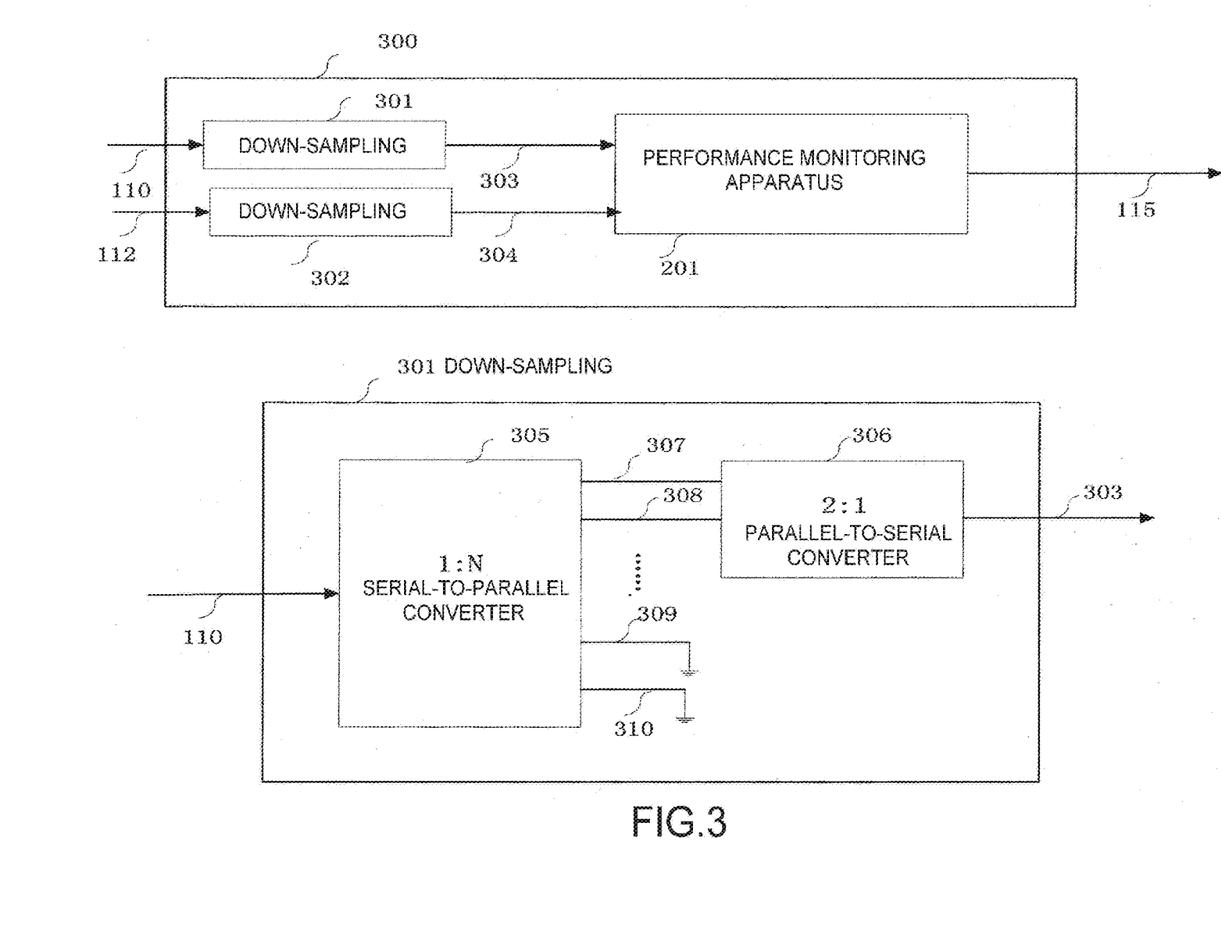
FIG. 3 illustrates a low speed method of implementing the apparatus for monitoring performance according to the present invention.

FIG. 3 illustrates a low speed method of implementing the apparatus for monitoring performance according to the present invention. In the low speed implementing method, the inputs 110 and 112 are firstly down-sampled respectively by the down-samplers 301 and 302. The rule for making down-sampling is to down-sample two adjacent symbols for every $N(N \geq 2)$ symbols. The inputs 110 and 112 are down-sampled to respectively obtain signals 303 and 304 serving as inputs into the performance monitoring apparatus 201. Since the signal rate of the signals 303 and 304 is only 2/N of the inputs 110 and 112, the processing speed of the performance monitoring apparatus is correspondingly reduced by 2/N, thus greatly reducing the difficulty in hardware realization.

FIG. 3 further provides the specific implementing method of the down-sampler 301. As shown in the lower portion of FIG. 3, the down-sampler 301 comprises an 1:N serial-to-parallel converter 305 and a 2:1 parallel-to-serial converter 306. After passing through the 1:N serial-to-parallel converter 305, the input 110 is output in parallel via N output ports of the serial-to-parallel converter 305, two adjoining ports randomly selected in the N ports are connected to the input of the 2:1 parallel-to-serial converter 306 while the remaining ports are grounded. The output from the 2:1 parallel-to-serial converter 306 is the down-sampled signal as required. Realization of the down-sampler 302 can be completely the same as realization of the down-sampler 301.

Figure 4A:
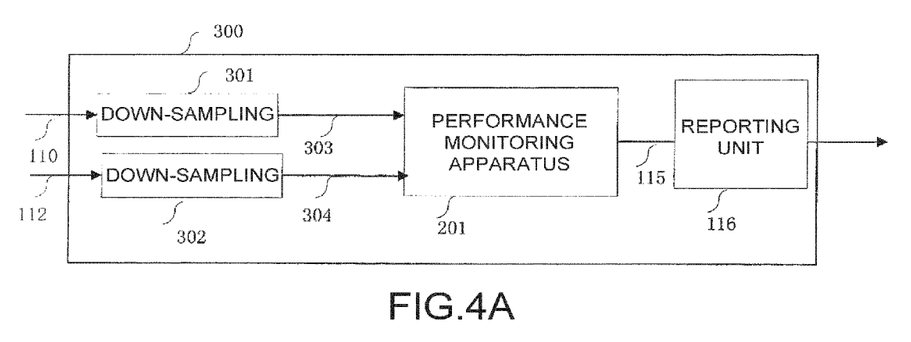
FIG. 4 illustrates a performance reporting module of the apparatus for monitoring performance according to the present invention.

As shown in FIG. 4A, according to another embodiment of the present invention, the performance monitoring apparatus of the present invention can further comprise a reporting unit 116. As should be noted, although the reporting unit 116 is simultaneously used with the low-speed implemented performance monitoring apparatus in FIG. 4A, it can nonetheless also be used simultaneously with the performance monitoring apparatus as shown in FIG. 2A and FIG. 2B. Additionally, although the reporting unit 116 is shown in FIG. 4A as a separate unit independent from the performance monitoring apparatus 201, it can be realized as a part of the performance monitoring apparatus 201.

Figure 4B:
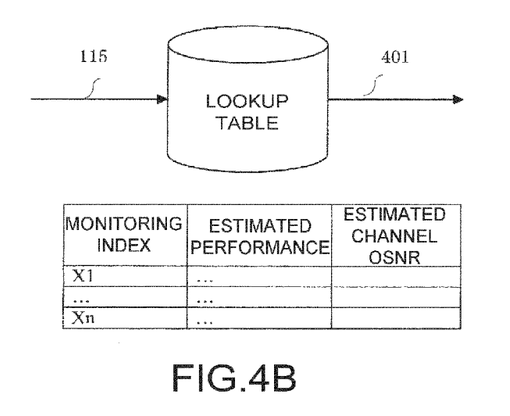

FIG. 4B provides realization of the reporting unit of the performance monitoring apparatus according to the present invention. The output 115 from the performance monitoring apparatus as shown in FIG. 2 and FIG. 3 is the variance $E\{\phi_{n,k}^2\}$ of the noise phase. As can be known from the foregoing explanations of the principle, the performance parameters of the receiver and the noise parameters of the channel can be directly calculated in accordance with the variance. Main function of the reporting unit as shown in FIG. 4A and FIG. 4B is to convert the output 115 from the performance monitoring apparatus into commonly employed performance parameters and/or channel noise parameters of the receiver. Such conversion can be directly carried out by the mathematical expression shown in the section that explains the principle, whereas FIG. 4B provides a method to implement such conversion via a lookup table. The index terms of the lookup table are different variance values (monitoring indices), while the lookup table further stores values of two additional parts. One part is the performance parameters of the receiver to which the variance values of the index terms correspond, and the performance parameters of the receiver can be such common parameters as the bit error rate and Q value etc., and can also be other user-defined parameters. Another part of the lookup table stores the optical signal-to-noise ratio (OSNR@0.1 nm) over the 0.1 nm bandwidth as calculated from the signal-to-noise ratio of the receiver. As should be noted, although two parameters are listed in the embodiment as exemplified in FIG. 4, it is actually also possible to be converted into only one parameter, or to be converted into more parameters.

Figure 5:
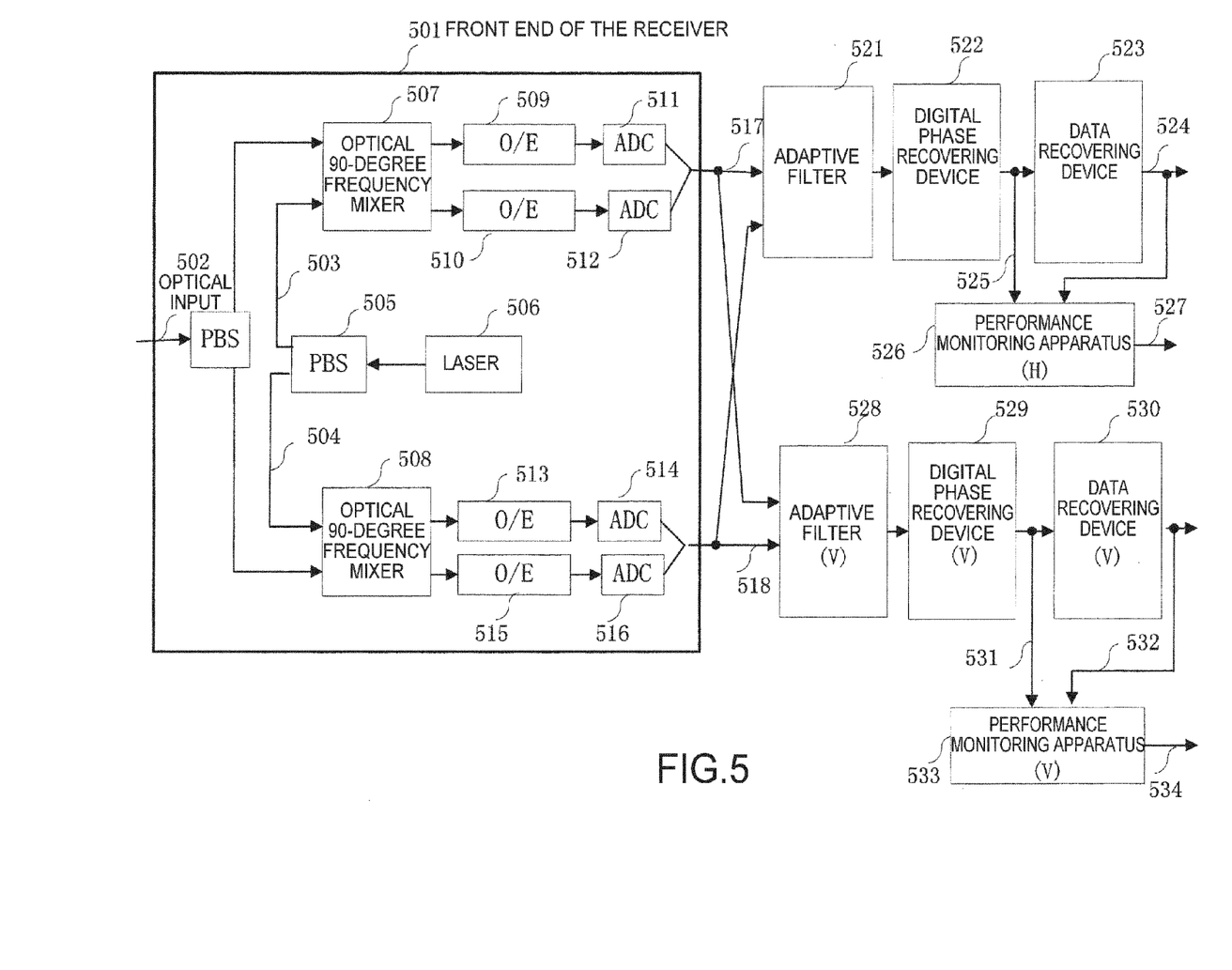
FIG. 5 illustrates a dual-polarization optical coherent receiver employing the apparatus for monitoring performance according to the present invention.

FIG. 5 provides a dual-polarization optical coherent receiver employing the apparatus for monitoring performance according to the present invention. The dual-polarization coherent receiver differs from the single-polarization coherent receiver as shown in FIG. 1 mainly in the fact that the dual-polarization receiver can simultaneously receive signals on two polarization states of the arriving light, whereas the single-polarization receiver can receive signals on only one polarization state. Thus, it is possible for the dual-polarization coherent receiver to achieve two times as much as transmission rate under the same baud rate. Therefore, the dual-polarization coherent receiver is increasingly used in the field of optical transmissions. The output from the laser 506 in FIG. 5 is divided by a polarization beam splitter (PBS) 505 into two polarization states orthogonal to each other, and the two polarization states are usually referred to as the horizontal polarization state (shortened as the H polarization state in the present invention) and the vertical polarization state (shortened as the V polarization state in the present invention). The H polarization state is input into a receiving branch (the first polarization state branch) consisting of the optical 90-degree frequency mixer 507, the optoelectric converters 509 and 510, and the analog-to-digital converters 511 and 512, and function of this branch is to convert the signal on the horizontal polarization state of the received light into the baseband electric signal. Similarly, the V polarization state is input into another receiving branch (the second polarization state branch) consisting of the optical 90-degree frequency mixer 508, the optoelectric converters 513 and 515, and the analog-to-digital converters 514 and 516, and function of this branch is to convert the signal on the vertical polarization state of the received light into the baseband electric signal. The laser 506, the polarization beam splitter 505 and the aforementioned two receiving branches together constitute the front end 501 of the dual-polarization optical coherent receiver. The two outputs 517 and 518 from the front end 501 are respectively input into the adaptive filters 521 and 528. Functions of the adaptive filters 521 and 528 are to compensate for the damage brought about by the channel to the signal while at the same time removing the crosstalk between the two polarization states. The output from the adaptive filter 521 is recovered by the digital phase recovering device 522 and the data recovering device 523. The output from the adaptive filter 528 is recovered by the digital phase recovering device 529 and the data recovering device 530.

The aforementioned adaptive filter 521, the digital phase recovering device 522 and the data recovering device 523 constitute the first polarization state receiving branch (the H polarization state branch). The aforementioned adaptive filter 528, the digital phase recovering device 529 and the data recovering device 530 constitute the second polarization state receiving branch (the V polarization state branch).

What is described above is the prior art dual-polarization optical coherent receiver, while the performance monitoring apparatus according to the present invention operates at two receiving polarization state branches independent from each other in the dual-polarization optical coherent receiver. The inputs 525 and 524 into the performance monitoring apparatus 526 as shown in FIG. 5 are respectively the outputs from the phase recovering device 522 and the data recovering device 523 on the H polarization state branch, whereas the inputs 531 and 532 into the performance monitoring apparatus 533 are respectively the outputs from the phase recovering device 529 and the data recovering device 530 on the V polarization state branch. The performance monitoring apparatuses 526 and 533 monitor the physical layer working performances of the H polarization state branch and the V polarization state branch as well as the noise characteristics of the H polarization state and the V polarization state in the channel independent from each other. The outputs from the performance monitoring apparatuses 526 and 533 directly provide performance monitoring results of different receiving polarization states, while such monitoring cannot be achieved in the traditional performance monitoring based on the bit error rate. The performance monitoring results for different polarization states are greatly helpful in positioning failures of the receiver, learning receiving performance differences of the different polarization states, and adjusting configuration parameters of the transmission system.

Figure 6:
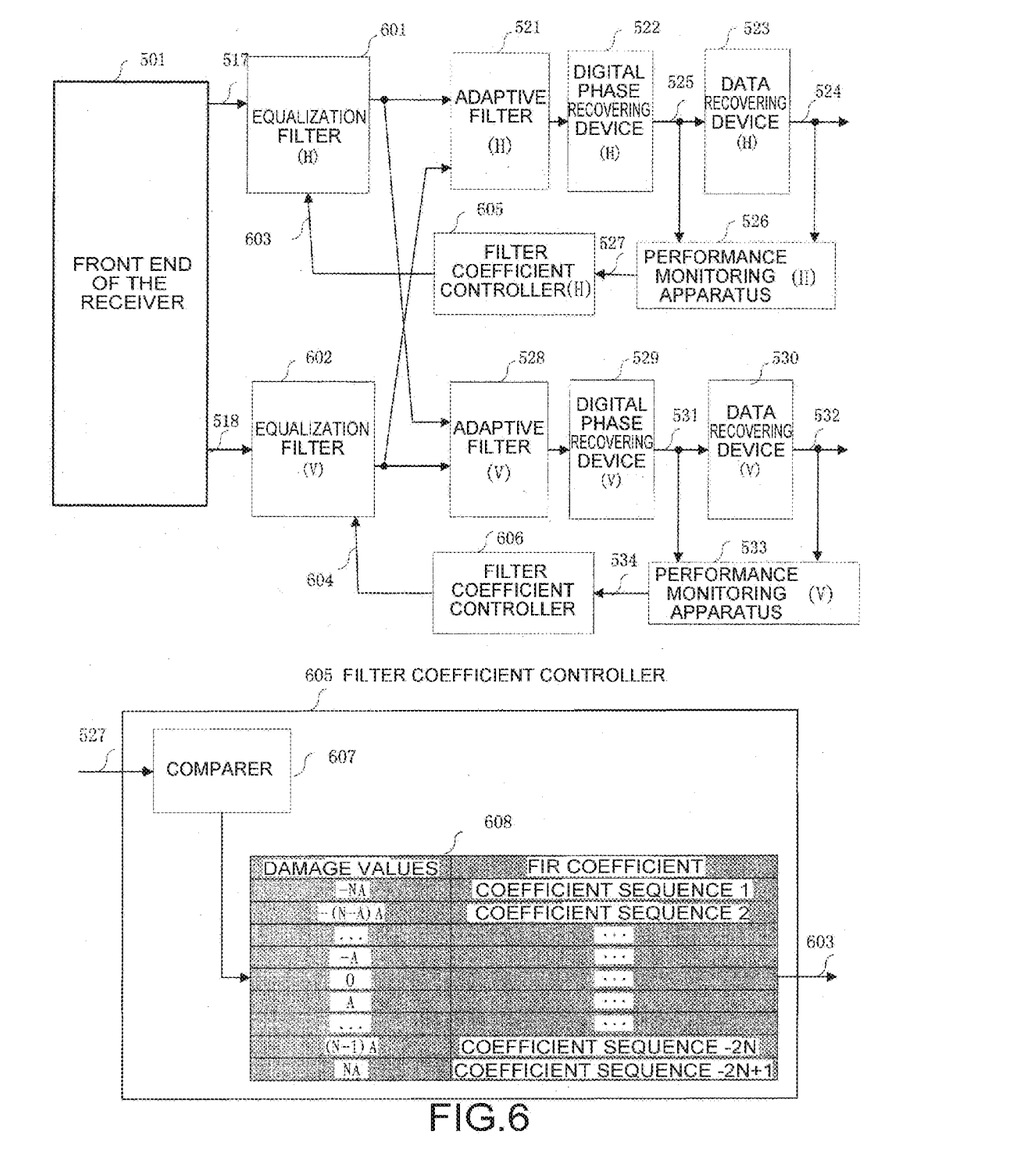
FIG. 6 illustrates an optical coherent receiver employing the apparatus for monitoring performance according to the present invention to adjust filter coefficient.
Figure 7:
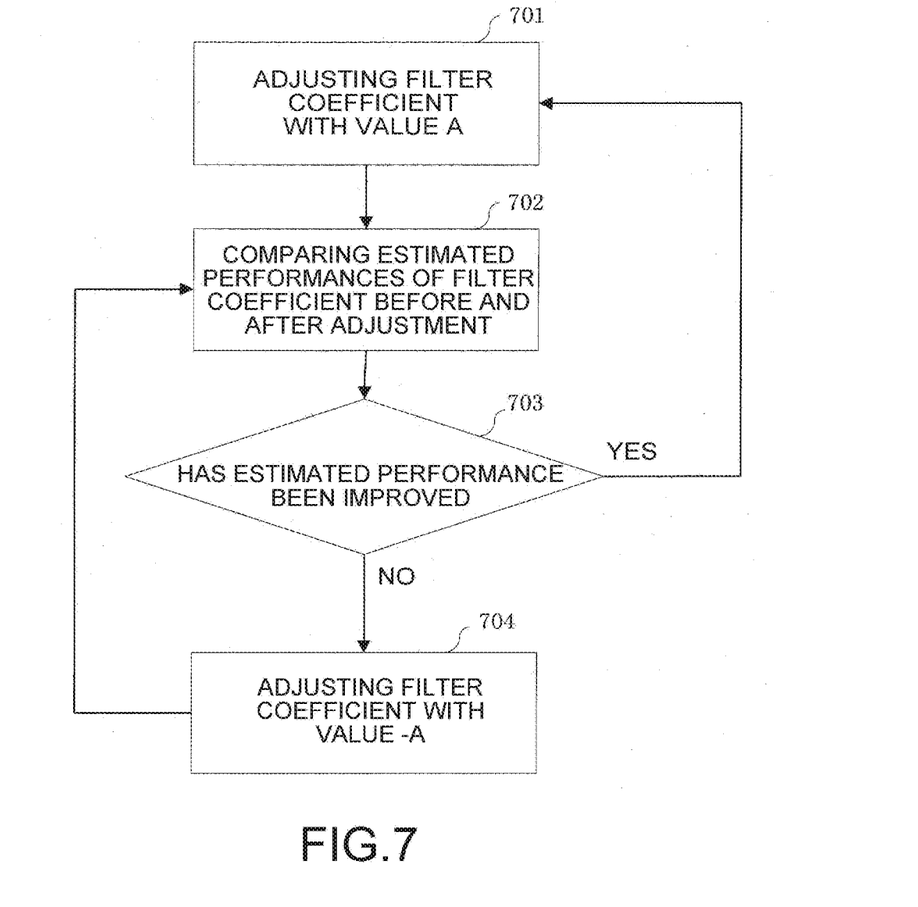
FIG. 7 illustrates a flow for employing the apparatus for monitoring performance according to the present invention to adjust filter coefficient.

FIG. 6 illustrates an optical coherent receiver employing the apparatus for monitoring performance according to the present invention to adjust the coefficient of an equalization filter. In comparison with the receiver as shown in FIG. 5, the receiver in FIG. 6 is added with two equalization filters 601 and 602 after the front end 501, and function of the two equalization filters is to compensate for the damage to the received signal endured in the channel. To reduce hardware complexity and lower the noise brought about by the filter, the coefficients of the equalization filters are not adaptively adjusted as that of the adaptive filters at the back end. The coefficients of the equalization filters are preset by the system. And there is hence the problem as to whether the preset coefficient is proper. No solution to this problem has been proposed so far in the prior art. However, application of the performance monitoring apparatus according to the present invention can quickly and precisely find the proper coefficient. The performance monitoring apparatuses 526 and 533 in FIG. 6 provide performance monitoring results of different receiving polarization states, and the results are respectively input into the filter coefficient control devices 605 and 606. The filter coefficient control devices 605 and 606 respectively adjust the coefficients of the equalization filters 601 and 602 in accordance with the performance monitoring results. The filter coefficient control device 605 can be realized as the comparer 607 and the lookup table 608. The lookup table 608 stores different coefficients that should be used in the equalization filter 601 or 602 to compensate for damages of differing degrees, for instance, in order to compensate for a damage of the degree —NA (where N is an integer and A is the step length of the lookup table), the filter coefficient (FIR coefficient) that should be used by the equalization filter 601 or 602 will be the coefficient sequence of 1. The comparer 607 changes the damage values as used to search in the lookup table 608 in accordance with changes in the output 527 from the performance monitoring apparatus 526, so as to adjust the output from the filter coefficient control device 605. The FIR coefficient in the lookup table 608 can be obtained in advance through theoretical computation or through experimentation or through simulation. Refer to FIG. 7 for the specific adjustment flow. The structure and the adjustment flow of the filter coefficient control device 606 can be identical with those of 605.

As should be noted, although the adaptive filters 521 and 528 are shown in FIG. 6 each as a single module, they can also be formed each of a plurality of filters.

FIG. 7 illustrates a flow for adjusting the coefficient of the equalization filter in accordance with the output from the performance monitoring apparatus according to the present invention. In Step 701, the filter coefficient control device 605 increases by A the damage value to which the coefficient of the current filter corresponds, then obtains a new filter coefficient to which the increased damage value corresponds, and assigns it to the equalization filter. In Step 702, the filter coefficient control device 605 compares the performance monitoring results provided by the performance monitoring apparatus 526 before Step 701 with that after Step 701. In Step 703, it is determined as to whether the performance has been improved in accordance with the difference between the monitoring results. If the performance has been improved, Step 701 is repeated; otherwise, the process goes to Step 704 to perform the reverse coefficient adjustment: i.e. the damage value to which the coefficient of the current filter corresponds is reduced by A, a new filter coefficient to which the reduced damage value corresponds is obtained and assigned to the equalization filter, and the process subsequently goes to Step 702. The performance to which each coefficient corresponds during the adjustment process can be simultaneously recorded in Step 703, and it is thus possible for the results of the performance monitoring apparatus according to the present invention to indicate the optimally proper filter coefficient by repeating the above steps. Of course, it is also possible to add determination based on a threshold value in Step 703, whereby the adjustment process of the coefficients is stopped when the performance is higher than a predetermined threshold value.

Control of the equalization filter 602 can be executed in the same manner and sequentially or in parallel as the equalization filter 601 is controlled.

Figure 8:
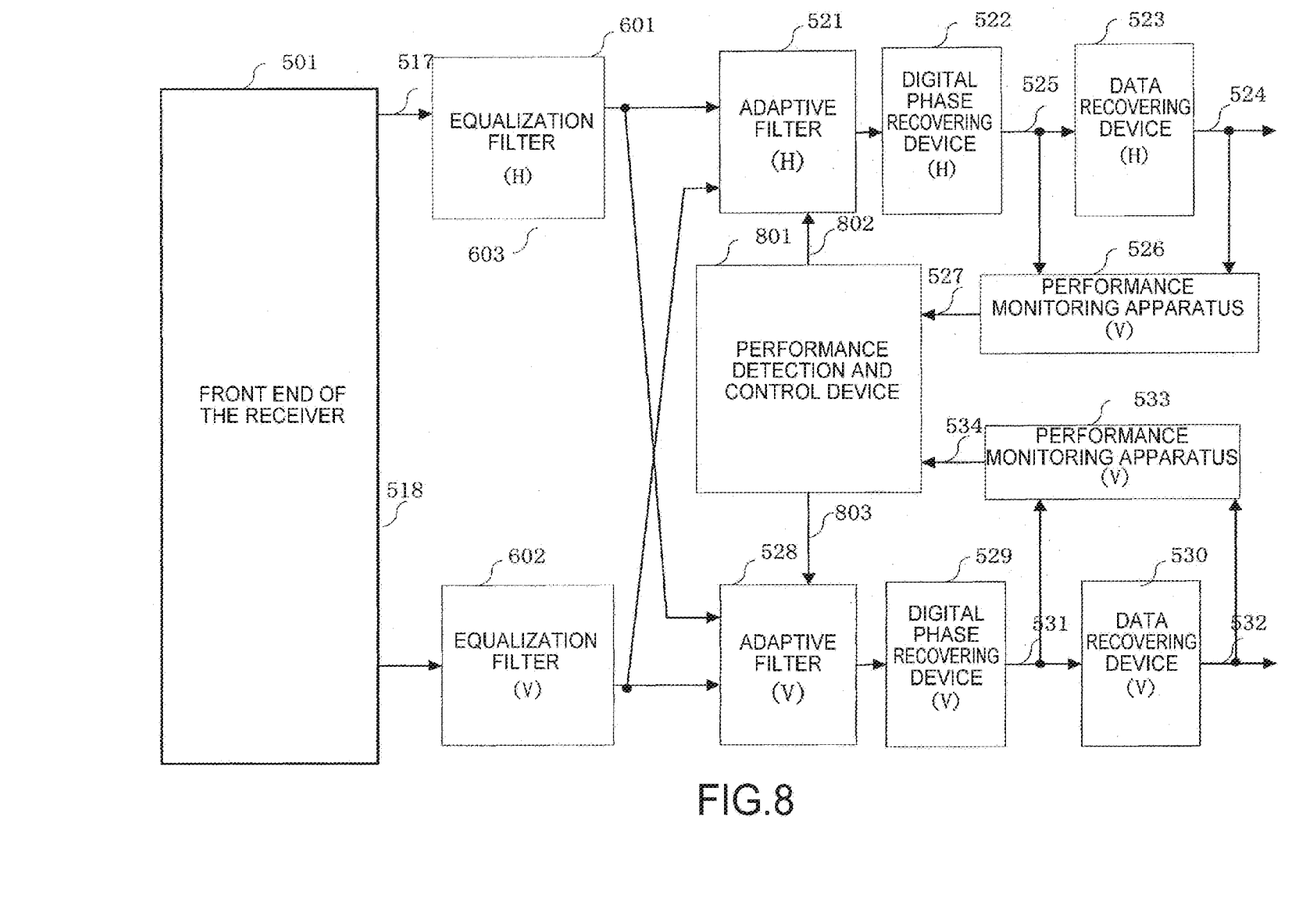
FIG. 8 illustrates an optical coherent receiver employing the apparatus for monitoring performance according to the present invention to position and remove receiver failures.
Figure 9:
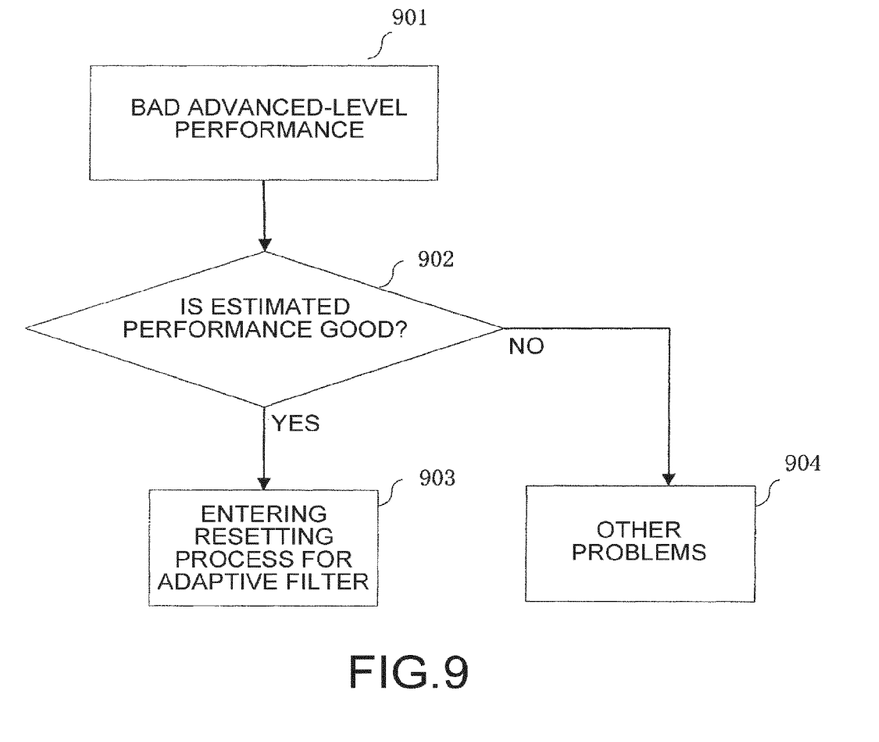
FIG. 9 illustrates a flow for employing the apparatus for monitoring performance according to the present invention to position and remove failures of an adaptive filter.

FIG. 8 illustrates an optical coherent receiver employing the apparatus for monitoring performance according to the present invention to position and remove failures. The outputs 527 and 534 from the performance monitoring apparatus in FIG. 8 are input into the performance detection and control device 801. The performance detection and control device 801 can be part of the network management system or a control module integrated in the receiver. Important functions of the performance detection and control device 801 are to collect such working state information of the receiver as the bit error rate, to warn, and to provide control interfaces to the receiver. As an application of the present invention, the performance detection and control device 801 can be incorporated with the warning information and the outputs 527 and 533 from the performance monitoring apparatus according to the present invention to position and remove failures. FIG. 9 provides an embodiment for positioning and removing failures.

FIG. 9 illustrates an embodiment of the performance monitoring apparatus according to the present invention for application in the process of positioning failures of the receiver. The signal on one polarization state might be completely lost during the receiving process in the dual-polarization optical coherent receiver due to the problem of coefficient convergence of the adaptive filter. Under such circumstance the receiver cannot operate, and it is extremely difficult to position such problem due to the complicated structure of the optical coherent receiver. The performance monitoring apparatus according to the present invention provides a simple and efficient method for addressing like problems.

In Step 901 of FIG. 9, the receiver triggers a warning of advanced level, such as loss of a frame, due to its incapability to operate; when such warning occurs, the process goes to Step 902. In Step 902, the physical layer working performances of the two receiving branches are determined in accordance with the monitoring results of the performance monitoring apparatus according to the present invention; if the signal on one polarization state is lost, the two branches of the receiver output signals having been compensated for damage on the same polarization state, at this time the physical layer working performances of the two branches are excellent. Accordingly, once the receiver is incapable of operating in spite of the excellent physical layer working performances of the two branches, it can be determined that the problem lies in the coefficient convergence of the adaptive filter. Consequently, when it is determined that the physical layer working performance is good (YES in Step 902), the process goes to Step 903 to reboot the coefficient convergence process of the adaptive filter to solve the problem. When it is determined that the physical layer working performance is not good (NO in Step 902), the process goes to Step 904 to solve the problem of the physical layer. What is illustrated in FIG. 9 is merely an example of positioning receiver failures. In practical applications, the performance monitoring results provided by the present invention provide direct and real-time physical layer information for positioning and removing failures. As an effective supplement to the advanced-level warnings of the receiver, such information is greatly helpful for most cases of failure positioning and removal.

Figure 10:
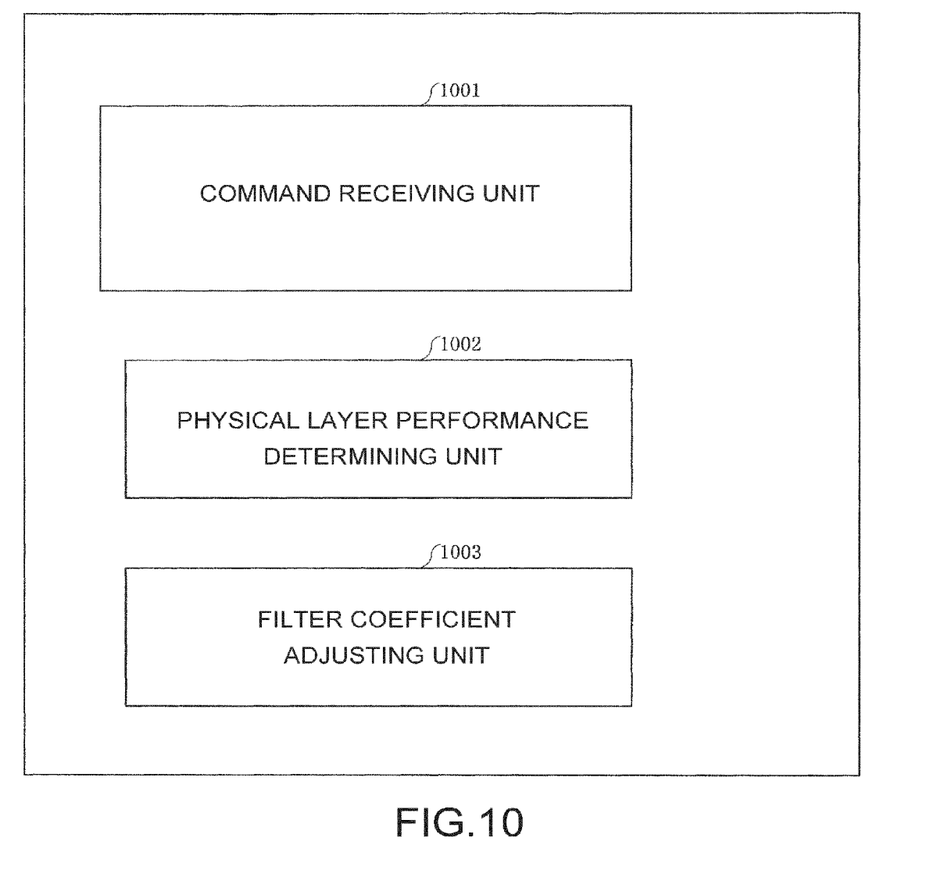
FIG. 10 is a structural block diagram illustrating a performance detection and control device for use to implement failure positioning as shown in FIG. 9.

FIG. 10 is a structural block diagram illustrating the performance detection and control device for use to implement failure positioning as shown in FIG. 9.

As shown in FIG. 10, the performance detection and control device according to one embodiment of the present invention comprises a command receiving unit 1001, a physical layer performance determining unit 1002, and a filter coefficient adjusting unit 1003.

The command receiving unit 1001 receives a warning of advanced level from the receiver, and upon receipt of the warning of advanced level, the physical layer performance determining unit 1002 determines whether it is a physical layer failure in accordance with both the signal 527 from the performance monitoring apparatus 526 and the signal 534 from the performance monitoring apparatus 533. When the physical layer performance determining unit 1002 determines the physical layer as working well, the filter coefficient adjusting unit 1003 performs adjustment on the filter coefficient.

Specific operations, methods and realizations of the control of the aforementioned adaptive equalization devices or adjustment of the aforementioned filter coefficients can be referred, for instance, to the realization of the adaptive equalization device in the Chinese Patent Application No. 200810108922.9 entitled "Adaptive Equalization Device and Method" and filed on Jun. 6, 2008, or to the filter coefficient changing apparatus and method in the Chinese Patent Application No. 200810090222.1 entitled "Filter Coefficient Changing Apparatus and Method" and filed on Apr. 1, 2008. Contents of the above two patents are herein incorporated by reference, as if they were entirely enunciated herein.

Figure 11:
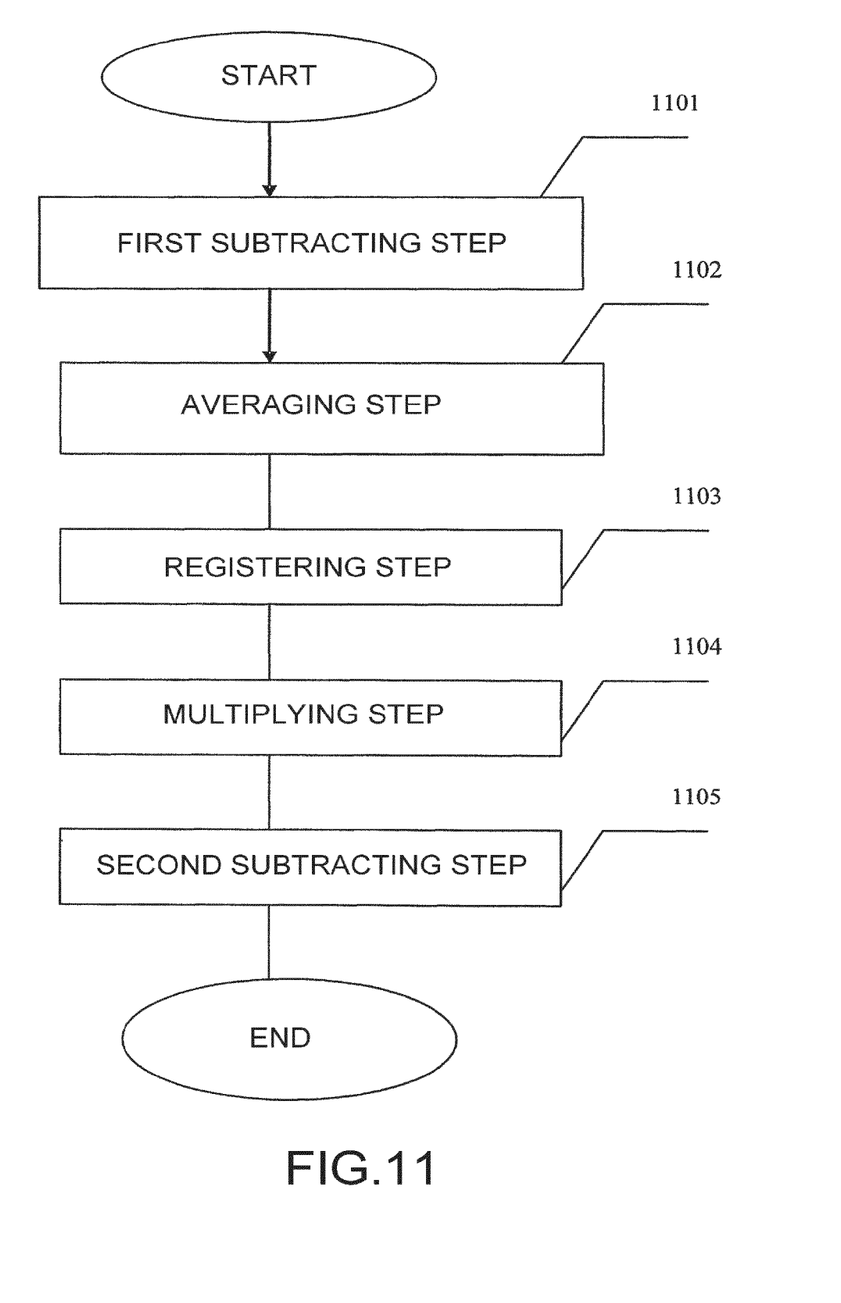
FIG. 11 is a flowchart illustrating the method of monitoring performance of an optical coherent receiver according to an embodiment of the present invention.

FIG. 11 is a flowchart illustrating the method of monitoring performance of an optical coherent receiver according to an embodiment of the present invention. As shown in FIG. 11, firstly in Step 1101, the second signal from the data recovering device 111 is subtracted from the first signal from the digital phase recovering device, and the square of the subtraction result in Step 1101 is then obtained in Step 1102. Moreover, although not shown in the drawings, there can be an averaging step after Step 1102 to average the result of Step 1102. At the same time, the subtraction result of Step 1101 is delayed for one symbol period in Step 1103, and subsequently in Step 1104, the delayed result in Step 1103 is then multiplied with the result of the first subtracting step in Step 1101. Moreover, although not shown in the drawings, there can be an averaging step after Step 1104 to average the result of Step 1104. Then in Step 1105, the result obtained in Step 1104 is subtracted from the result obtained in Step 1102. Furthermore, it is preferable to further average the result obtained in Step 1105.

As should be explained, the scope of the present invention can further include a computer program enabling such a logic device as a single chip computer to execute the method of monitoring performance according to the present invention or serving as the apparatus for monitoring performance according to the present invention as well as a computer readable storage medium storing the program. As the recording medium, there can be a computer readable floppy disk, hard disk, semiconductor memory, CD-ROM, DVD, magnetic disk (MO) or other media.

As should be understood, the scope of the present invention is not restricted by the above explanations, as the present invention covers many variations, modifications and analogs within the scope of the spirits and provisos defined in the attached claims.

Features described and/or illustrated with regard to one embodiment can be used in the same or similar manner in one or more other embodiments, combine with features in other embodiments, or replace features in other embodiments.

As should be noted, the term "comprise/include" and "comprising/including" as used in the present documents means the existence of features, integral parts, steps or component parts, but does not exclude the existence or addition of other features, integral parts, steps or component parts.

The invention claimed is:

1. An apparatus for monitoring performance of an optical coherent receiver, the apparatus making use of a first signal and a second signal from the optical coherent receiver to monitor performance of the optical coherent receiver, and the apparatus comprising:
    a first subtracter, for subtracting the second signal from the first signal to obtain a first subtraction result;
    a squarer, for obtaining a square of the first subtraction result;
    a delayer, for delaying the first subtraction result;
    a multiplier, for multiplying the first subtraction result with the first subtraction result delayed by the delayer; and
    a second subtracter, for subtracting the result of the multiplier from the result of the squarer.

2. The apparatus according to claim 1, further comprising:
    an averager, for averaging the result output by the second subtracter.

3. The apparatus according to claim 1, further comprising:
    a first averager, for averaging the square of the first subtraction result obtained by the squarer; and
    a second averager, for averaging the multiplication result of the multiplier;
    wherein the second subtracter subtracts the result of the second averager from the result of the first averager.

4. An optical coherent receiver comprising a data recovering device, wherein the optical coherent receiver further comprises the apparatus according to any claim 1, the first signal is a signal input into the data recovering device, and that the second signal is a signal output from the data recovering device.

5. The optical coherent receiver according to claim 4, further comprising a reporting unit for converting the output of the second subtracter or the averaged output of the second subtracter into commonly employed performance parameters and/or channel noise parameters of the receiver.

6. The optical coherent receiver according to claim 4, wherein the optical coherent receiver is a dual-polarization optical coherent receiver, and the optical coherent receiver includes two said apparatuses for respectively monitoring performance of a first polarization state receiving branch and a second polarization state receiving branch.

7. The optical coherent receiver according to claim 6, wherein the first polarization state receiving branch includes a first equalization filter, the second polarization state receiving branch includes a second equalization filter, and the optical coherent receiver further comprises:
    a first filter coefficient control device, for controlling the first equalization filter in accordance with an output of said apparatus that monitors the first polarization state receiving branch; and
    a second filter coefficient control device, for controlling the second equalization filter in accordance with an output of said apparatus that monitors the second polarization state receiving branch.

8. The optical coherent receiver according to claim 6, wherein the first polarization state receiving branch includes a first adaptive filter, the second polarization state receiving branch includes a second adaptive filter, and the optical coherent receiver further comprises:
    an adaptive filter coefficient control device, for controlling the first adaptive filter and the second adaptive filter in accordance with both the output of the apparatus that monitors the first polarization state receiving branch and the output of the apparatus that monitors the second polarization state receiving branch.

9. The optical coherent receiver according to claim 8, wherein the adaptive filter coefficient control device comprises:
    a command receiving unit, for receiving performance information from the optical coherent receiver;
    a physical layer performance determining unit, for determining performance of the physical layer of the optical coherent receiver; and
    a filter coefficient adjusting unit, for performing coefficient updating control on the first adaptive filter and the second adaptive filter when it is determined by the physical layer performance determining unit that the performance of the physical layer is good.

10. A method of monitoring performance of an optical coherent receiver, the method making use of a first signal and a second signal from the optical coherent receiver to monitor performance of the optical coherent receiver, and the method comprising:

subtracting the second signal from the first signal to obtain a first subtraction result;

obtaining a square of the first subtraction result;

delaying the first subtraction result;

multiplying the first subtraction result with the delayed first subtraction result; and     subtracting the result of the multiplying from the result of the obtaining.

11. The apparatus according to claim 2, further comprising:

a first averager, for averaging the square of the first subtraction result obtained by the squarer; and     a second averager, for averaging the multiplication result of the multiplier;

wherein the second subtracter subtracts the result of the second averager from the result of the first averager.

12. An optical coherent receiver comprising a data recovering device, wherein the optical coherent receiver further comprises the apparatus according to claim 2, the first signal is a signal input into the data recovering device, and that the second signal is a signal output from the data recovering device.

13. An optical coherent receiver comprising a data recovering device, wherein the optical coherent receiver further comprises the apparatus according to claim 3, the first signal is a signal input into the data recovering device, and that the second signal is a signal output from the data recovering device.

* * * * *

UNITED STATES PATENT AND TRADEMARK OFFICE
CERTIFICATE OF CORRECTION

PATENT NO.        : 8,571,407 B2                                      Page 1 of 1
APPLICATION NO.   : 12/567245
DATED             : October 29, 2013
INVENTOR(S)       : Lei Li et al.

It is certified that error appears in the above-identified patent and that said Letters Patent is hereby corrected as shown below:

In the Claims

In Column 12, Line 13 (Approx.), In Claim 4, delete "to any" and insert -- to --, therefor.

Signed and Sealed this
Eighteenth Day of February, 2014

Michelle K. Lee
*Deputy Director of the United States Patent and Trademark Office*